May 28, 1963  A. AMBLI  3,091,478
MUD FLAP STABILIZER
Filed June 26, 1962
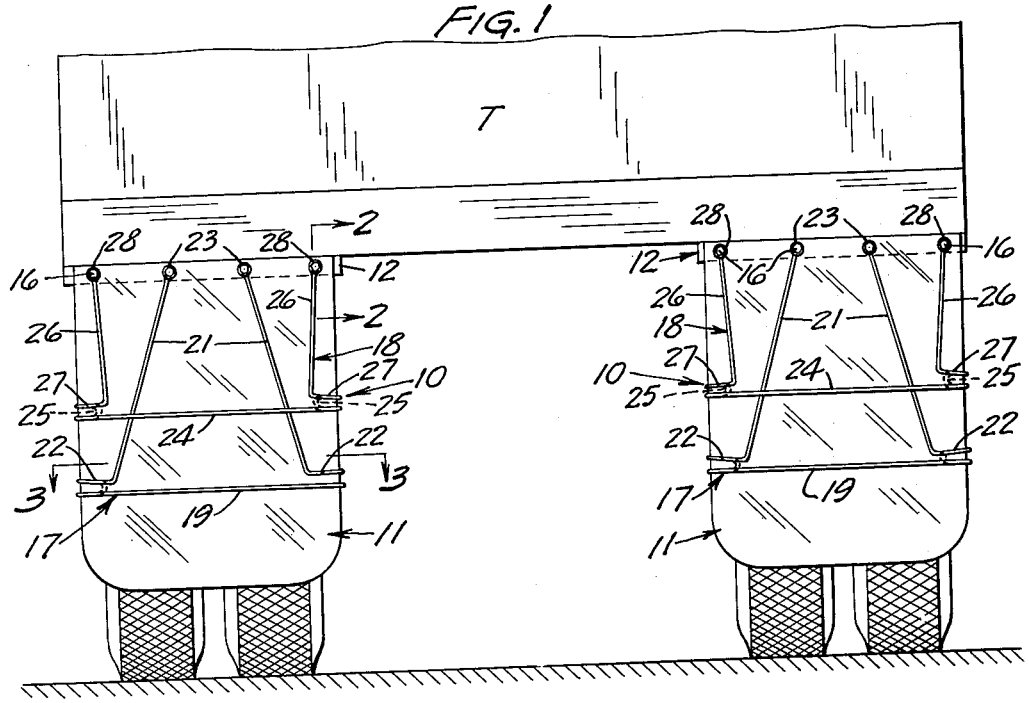
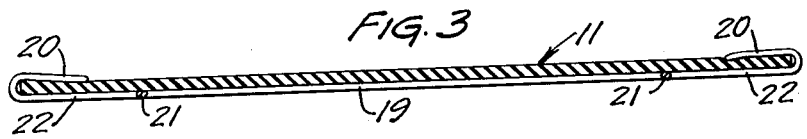
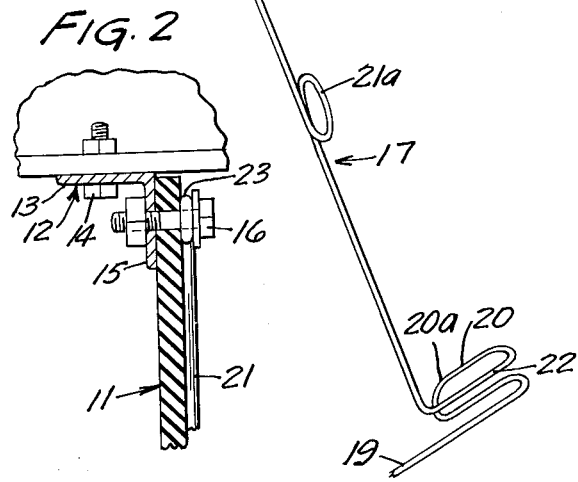
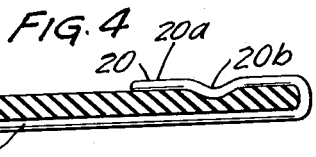
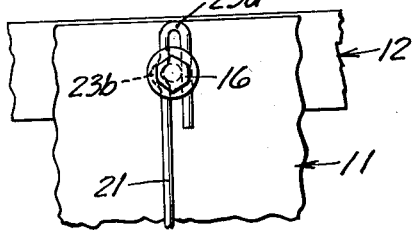
INVENTOR
ANDREW AMBLI
BY
Williamson & Palmatier
ATTORNEYS

United States Patent Office 3,091,478
Patented May 28, 1963

3,091,478
MUD FLAP STABILIZER
Andrew Ambli, 2360 W. County Road, St. Paul, Minn.
Filed June 26, 1962, Ser. No. 205,292
7 Claims. (Cl. 280—154.5)

This invention relates to mud flaps for use with vehicle wheels and more specifically to stabilizer devices for mud flaps.

One of the problems associated with flexible mud flaps used in conjunction with rear wheels is that these mud flaps are subject to sudden flexing and whipping which often results in breakage or failure of the mud flap. Many States require the use of mud flaps for large trucks and trailer type vehicles and in some of these States the mud flaps are required to be arranged and constructed so that the maximum angular swing from the normal vertical position cannot exceed an angle of approximately thirty degrees. Another problem is that of premature wear of the mud flaps since the flexible type mud flaps are secured to the truck body by means of bolts or the like and when the grommets of the flaps become worn the mud flaps then become detached from the truck body. This invention is directed to overcoming these problems of maintenance and wear of flexible type mud flaps.

It is therefore a general object of this invention to provide a novel stabilizer device, of simple and inexpensive construction, which is readily attachable to a flexible type mud flap for use in imparting stability to the mud flap and to thereby reduce the tendency of the mud flap to break.

Another object of this invention is to provide a novel and improved mud flap stabilizer device including a frame member of single piece metallic construction and comprised of a transverse portion and a pair of edge gripping portions for imparting rigidity to the median and edge areas of a conventional flexible type mud flap, and also including a pair of vertically extending leg portions each being attachable at its upper end to the truck body to secure and clamp the upper edge of the mud flap to the vehicle body.

A further object of this invention is to provide a mud flap stabilizer device including at least a pair of single-piece frame members, each gripping and engaging a conventional flexible type mud flap for imparting rigidity to the mud flap while also permitting adequate flexing of such a mud flap due to sudden and extreme flexing is substantially reduced if not precluded.

These and other objects and advantages of my invention will more fully appear from the following description made in connection with the accompanying drawings wherein like character references refer to the same or similar parts throughout the several views, and in which:

FIG. 1 is a rear elevational view of the rear portion of a vehicle having conventional flexible type mud flaps to which my novel stabilizer device is attached;

FIG. 2 is a vertical cross-sectional view on an enlarged scale taken approximately along line 2—2 of FIG. 1 and looking in the direction of the arrows;

FIG. 3 is a transverse cross-sectional view on an enlarged scale taken approximately along line 3—3 of FIG. 1 and looking in the direction of the arrows;

FIG. 4 is a fragmentary detail view of a modified form of my invention;

FIG. 5 is a fragmentary perspective view of a further modification of my invention and;

FIG. 6 is a fragmentary detail view of another modified form of my invention.

Referring now to the drawing and more specifically to FIGS. 1 to 3 it will be seen that one embodiment of my novel mud flap stabilizer device designated in its entirety by the reference numeral 10 is thereshown. In FIG. 1 it will be seen that the rear portion of a vehicle such as a truck body or trailer is illustrated and is provided with a conventional mud flap 11 disposed forwardly of and in close proximity to the rear dual wheels of the vehicle. The mud flaps 11 are of conventional construction and are preferably formed of a flexible, somewhat resilient material such as rubber or the like and are of generally elongate rectangular configuration.

Referring now to FIG. 2 it will be seen that the truck body T is provided with a pair of angle members 12 to which the mud flaps 11 are secured. It will be seen that one of the legs 13 of each angle member 12 is secured to the truck body by any conventional securing means such as bolt assemblies 14 and that the vertically disposed leg 15 of the angle member is suitably apertured to permit attachment of the mud flap 11 from thereto. It is pointed out that each of the mud flaps 11 is provided with a plurality of transversely spaced-apart grommets adjacent the upper edge thereof through which a suitable bolt assembly 16 extends for attaching the mud flaps to their respective angle members. In this connection it is pointed out that the vertical leg 15 of each angle member is also suitably apertured for the reception of the bolt assembly 16 therethrough. Thus it will be seen that the mud flaps 11 are secured to the truck body and extend in substantially vertically extending relation therefrom.

Referring again to FIG. 1 it will be seen that my novel stabilizer device 10 includes a lower frame member or harness 17 and an upper frame member or harness 18. Each of the frame members 17 and 18 are preferably constructed of an elongate wire formed of a suitable metallic material. The lower frame 17 includes a transverse portion 19 which engages the rear surface of a mud flap 11 intermediate the ends thereof in transversely extending relation relative thereto. Opposite ends of the transverse portion 19 of the lower frame member 17 is bent to define substantially U-shaped edge gripping portions 20 which extend around the vertical longitudinal edges of the mud flaps intermediate ends thereof and which are disposed in engaging relation with the front surface of the mud flap as best seen in FIG. 3.

The lower frame member 17 also includes a pair of vertically extending leg portions 21 which engage the rear surface of the mud flap and which converge upwardly and terminate adjacent the upper edge of the mud flap. It will be noted that each of the leg portions 21 are laterally offset as at 22 and this laterally extending offset lower end of each leg is integrally formed with one of the U-shaped edge gripping or clamping portions 20. Thus it will be seen that in the lower frame member 17, each of the leg portions 21 and the transverse portion 19 thereof cooperates with the edge gripping portion 20 to grip the edges of the mud flap for imparting rigidity thereto and also reenforce the centrally located major longitudinal area of the mud flap.

Referring again to FIGS. 1 and 2 it will be seen that the upper terminal end of each of the leg portions 21 is arcuately bent to define an attachment element or eye 23 through which one of the bolt assemblies 16 extends. It is pointed out that the attachment eye 23 of each leg portion 21 is positioned against and in registering relation with one of the grommets as the mud flap 11 so that in effect the mud flap is clamped against the vertical leg 15 of angle 12 by the legs 21 of the lower frame 17. This arrangement prevents the rubber material adajcent the grommet to be worn by direct contact with the bolts so that the tendency of the mud flap to become detached from its associated angle member is very substantially reduced.

Referring again to FIG. 1 it will be seen that the upper frame member 18 also includes a transverse portion 24 which engages and traverses the rear surface of the mud flap and is spaced above the transverse portion 19 of the lower frame member 17. Opposite ends of the transverse portion 24 are bent to define substantially U-shaped edge gripping or clamping portions 25, the latter extending around the vertical longitudinal edges of the mud flap and engaging the front surface thereof. It will be noted that the edge gripping portions 25 of the upper frame member 18 are spaced above the edge gripping portion 22 of the lower frame member 17.

The upper frame member 18 also includes a pair of vertically extending leg portions 26 which are spaced inwardly of the longitudinal edges of the mud flap and which terminate adjacent the upper edge thereof. It will be noted that the lower end of each of the leg portions 26 is laterally offset as at 27 and is integrally formed with one of the edge gripping portions 25 as best seen in FIG. 1. It will also be seen that the leg portions and transverse portion of the upper frame member 18 cooperates with the U-shaped gripping portions 25 to grip the longitudinally extending vertical edges of the mud flap to impart rigidity thereto and also to reenforce the upper portion of the mud flap. In this connection it will be seen that the transverse portion 24 overlies the leg portions 21 of the lower frame member 17 and that the leg portions 26 of the upper frame member 18 reenforces the marginal portions of the mud flap.

The upper terminal ends of each of the leg portions 26 are arcuately bent to define attachment elements 28 which are also in the form of attachment eyes in the manner of the attachment eyes 23 of the lower frame member 17. These attachment eyes 28 are also positioned in registering relation with respect to certain of the grommets of the mud flap and receive therethrough the bolt assemblies 16 to permit ready attachment to the upper frame member 18 to the angle member 12 in clamped relation with respect to the mud flap.

The mud flap stabilizer device when applied to a mud flap serves to prevent rapid flexing or whipping of the mud flap, an undesirable characteristic of many of the flexible type of mud flaps. The upper and lower frame members support the mud flap and also reenforce the marginal portions of the mud flap imparting rigidity to the median portions thereof so that the whipping movement of the mud flap is precluded. However, because of the inherent resiliency of the frame members, these frame members along with their associated mud flaps are capable of adequate flexing so that the mud flap and frames will not become permanently deformed when subjected to impacts from stones and the like. It has been found that through the use of my novel stabilizer device 10, the mud flap is prevented from flexing beyond the thirty degree angle from the angle vertically disposed position. It is also pointed out that the eyelet at the upper ends of each of the frame members not only permit the frame members to be readily attached to the truck body but also serve to suitably reenforce the mud flap along its upper longitudinal edge. The leg portions of each of the frame members also imparts rigidity to the upper edge marginal areas so that flexing and breakage along these areas of the mud flap is prevented.

Referring now to FIG. 4, it will be seen that a modified form of my stabilizer device is there shown. FIG. 4 is the fragmentary cross-sectional view similar to FIG. 3 illustrating the transverse portion 19 and one of the edge gripping portions 20. Each of the U-shaped edge portions 20 is comprised of a pair of leg elements 20a which are joined by bight portion, and in the embodiment illustrated in FIG. 4 each of these leg elements 20a is provided with an arcuate offset median portion 20b for more positively engaging and gripping the rear surface of the mud flap. This arcuately offset median portion 20b of each leg element 20a is offset as by crimping and it is pointed out that the U-shaped edge gripping portions 25 of the upper frame member 18 can also be provided with arcuately offset crimped portion in the manner of the gripping portions 20 of the lower frame member 17 as illustrated in a modified form of FIG. 4.

Referring now to FIG. 5 it will be seen that in the modified form of the lower frame member illustrated therein, each of the leg portions 21 is bent intermediate the ends thereof to form a complete loop 21a, the latter projecting rearwardly of the mud flap when the stabilizer device is so attached to such a mud flap. This loop 21a in each leg portion 21 permits the leg portions to be not only readily flexed intermediate their effective ends but also permits the leg portions to be longitudinally extended and retracted. While the embodiment illustrated in FIG. 5 is directed to the lower frame member 17, it is also pointed out that the leg portion 26 of the upper frame member 18 may also be arcuately bent to form loops intermediate the respective ends thereof.

Referring now to FIG. 6, it will be seen that in the modified form illustrated therein the upper terminal end of the leg portions 21 are arcuately bent to define an elongate inverted U-shaped attachment element 23a as distinguished on the attachment eye of the embodiment illustrated in FIGS. 1 to 3. It will also be noted that the U-shaped attachment element 23a is provided with an arcuate portion 23b for accommodating the bolt assembly 16 which is utilized for attaching the frame and mud flap to the vehicle body. With this arrangement it will be seen that the U-shaped attachment elements of the leg portions engage, clamp and reenforce a substantial area adjacent the grommets through which the bolt assemblies pass to thereby prevent wear along these areas of the mud flap. It is pointed out that the U-shaped attachment elements illustrated in the embodiment FIG. 6 may be employed in both the upper and lower frame members.

From the foregoing it will be seen that I have provided a novel stabilizer device which is readily attachable to a flexible type mud flap for imparting rigidity to the mud flap at those areas which are subjected to wear and stress. It will also be seen from the preceding paragraph that my novel stabilizer device is comprised of a pair of metallic frame members which are arranged and constructed to grip the mud flap to prevent breakage or failure of the mud flap due to sudden and rapid flexing thereof.

It will therefore be seen that I have provided a novel mud flap stabilizer device which is not only of simple and inexpensive construction but one which functions in a more efficient manner than any heretofore known comparable device.

It will of course be understood that various changes may be made in the form, details, arrangement and proportions of the various parts without departing from the scope of my invention.

What is claimed is:

1. A mud flap stabilizer device for use with an elongate, generally rectangular-shaped mud flap of the type formed of flexible material, and being swingably supported adjacent its upper end from a vehicle body rearwardly of and in close proximity to a vehicle wheel mounted tire, said stabilizer device comprising a stabilizer frame member formed of single piece construction and including an elongate transverse portion engageable in transversely extending relation with a mud flap intermediate the ends thereof, a pair of edge gripping portions each being integrally formed with one end of said transverse portion for gripping the vertical longitudinal edges of the mud flap intermediate the ends thereof, a pair of leg portions each being integrally formed with one of said edge gripping portions and extending vertically upwardly therefrom and each terminating adjacent the upper marginal edge of the mud flap, a pair of attachment elements each being integrally formed with the upper terminal end of one of said leg portions for cooperative engagement with securing means for securing said frame member to the vehicle body in clamped relation against the mud flap.

2. A mud flap stabilizer device for use with an elongate, generally rectangular-shaped mud flap of the type formed of flexible material, and being swingably supported adjacent its upper end from a vehicle body rearwardly of and in close proximity to a vehicle wheel mounted tire, said stabilizer device comprising a stabilizer frame member formed of a single piece wire construction and including an elongate transverse portion engageable with the rear surface of the mud flap in transversely extending relation intermediate the ends thereof, a pair of U-shaped edge clamping portions each being integrally formed with one end of said transverse portion and engaging the front surface of the mud flap, a pair of leg portions each being integrally formed with one of said U-shaped clamping members and extending upwardly therefrom, said leg portions cooperating with said transverse portion and said U-shaped edge clamping portions for clamping the vertical longitudinal edges of the mud flap intermediate the ends thereof, and a pair of attachment elements each being integrally formed with the upper terminal end of one of said leg portions for engagement with securing means for attaching said frame member to the vehicle body in clamped relation against the mud flap.

3. The structure defined in claim 2 wherein each of said leg portions is arcuately bent intermediate its ends to define a loop extending rearwardly of the mud flap to thereby permit said leg portions to readily flex and to be longitudinally tensioned.

4. The structure defined in claim 2 wherein each of said edge clamping portions is comprised of a pair of leg elements each of which is arcuately bent intermediate the ends thereof.

5. A mud flap stabilizer device for use with an elongate, generally rectangular-shaped mud flap of the type formed of flexible material, and being swingably supported adjacent its upper end from a vehicle body rearwardly of and in close proximity to the vehicle wheel mounted tire, said stabilizer device comprising a pair of frame members each being formed of single piece metallic construction and each including a transverse portion engageable with the rear surface of a mud flap in transversely extending relation intermediate the ends thereof, each of said transverse portions having opposite ends thereof arcuately bent to define a pair of U-shaped edge clamping portions engageable with the front surface of the mud flap, each of said frame members including a pair of leg portions each being integrally formed with one of said edge gripping poritons and extending vertically upwardly therefrom, and each of said leg portions being bent adjacent the upper terminal end thereof to define an attachment eye for receiving securing means therethrough to permit said frame members to be attached to the vehicle body in clamped relation against the mud flap.

6. The structure as defined in claim 5 wherein each leg portion of each of said frame members is arcuately bent intermediate its end to define a loop thereby permitting said leg portions to readily flex and to be longitudinally tensioned.

7. A splash guard for automotive vehicles comprising a generally rectangular flexible rubber sheet, a central reinforcing metal frame member having a generally triangular shape with generally rectangular loops formed at the base thereof adapted to receive the sides of said rubber sheet and a lateral reinforcing metal frame member having a generally rectangular shape with generally rectangular loops formed in the sides and at the base thereof adapted to receive the sides of said rubber sheet.

References Cited in the file of this patent

UNITED STATES PATENTS

| 1,754,147 | Cookson | Apr. 8, 1930 |
| 3,059,945 | Robb | Oct. 23, 1962 |

FOREIGN PATENTS

| 311,273 | Germany | Mar. 8, 1919 |